C. A. SNIDER.
TAPE MEASURE ATTACHMENT.
APPLICATION FILED SEPT. 3, 1915.
1,238,841.
Patented Sept. 4, 1917.
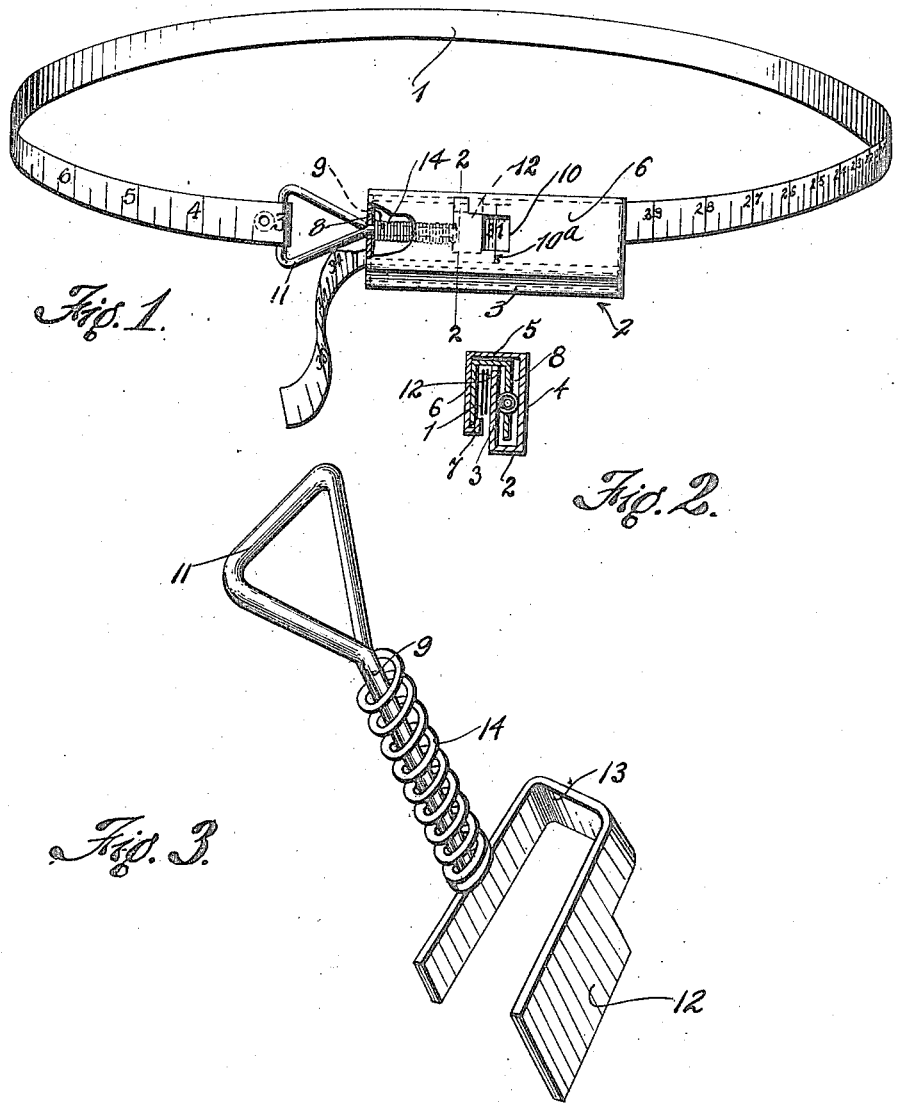
WITNESSES
INVENTOR
Clarence A. Snider
BY
ATTORNEY

UNITED STATES PATENT OFFICE.

CLARENCE A. SNIDER, OF INDIANAPOLIS, INDIANA.

TAPE-MEASURE ATTACHMENT.

1,238,841.   Specification of Letters Patent.   Patented Sept. 4, 1917.

Application filed September 3, 1915. Serial No. 48,386.

*To all whom it may concern:*

Be it known that I, CLARENCE A. SNIDER, citizen of the United States, residing at Indianapolis, in the county of Marion and State of Indiana, have invented certain new and useful Improvements in Tape-Measure Attachments, of which the following is a specification.

My invention relates to the class of measuring instruments and more particularly to that class of devices known as tape measures.

A primary object of my invention is to provide a tape measure attachment having means associated therewith whereby the user thereof may obtain correct measurements, though inexperienced in handling tape measures.

Another object of my invention is to provide a novel indicating means for tape measures which is readily applicable to any tape measure now in use.

With the above and other objects in view my invention resides preferably in the construction, combination, and arrangement of parts as hereinafter set forth in the specification and illustrated in the accompanying drawing, in which—

Figure 1 is a perspective view of the tape measure showing my invention applied thereto.

Fig. 2 is a transverse sectional view taken on a line 2—2 of Fig. 1.

Fig. 3 is an enlarged perspective view of the indicating member employed in the preferred embodiment of my invention.

Similar reference characters designate similar parts throughout the various views of the drawing.

In the drawing wherein the preferred embodiment of my invention is illustrated, an ordinary tape measure is designated 1 and has one of its extremities connected with the movable element of my invention hereinafter described.

My invention includes a housing 2 formed of bendable material and provided with inner and outer walls 3 and 4 respectively. The outer wall 4 is bent to provide a laterally extending portion 5 terminating in a protecting plate or guide plate 6, said protecting plate having the free marginal edge thereof bent to form a retaining flange 7. End walls 8 are arranged upon the casing, one of which is provided with a suitable opening therein, to accommodate a slidably mounted rod 9. One extremity of said rod 9 has connection with the tape measure while the other extremity carries an indicating plate described in detail hereinafter. As shown to advantage in Fig. 1 the protecting plate 6 is provided with a sight opening 10 which is disposed at a place substantially intermediate of the length of said plate.

As shown to advantage in Fig. 3, the rod 9 is provided with a loop 11 on one extremity to which one extremity of the tape measure may be affixed. The opposite extremity of said rod 9 carries an indicating plate 12 having an angular arm 13 extending from within the housing outwardly to bring said indicating plate at times into registration with the opening 10. A suitable releasing means comprising in the present instance a coil spring 14 is arranged about and engaged with said rod whereby to maintain the plate 12 normally over the opening or in closed position.

By reference again to Fig. 1, it will be observed that the sight opening 10 is provided at diametrically opposite points disposed centrally of the width thereof, with sight lines $10^a$. These lines $10^a$ are for the purpose of registering with the graduations on the tape 1, whereby the reading of a measurement is obtained. In the use of the tape measure, it is placed about an object to be measured in the usual manner, the free end thereof being drawn through the space between the member 12 and the wall 3 as shown in Fig. 2. The sight opening 10 is at this time closed by reason of the action of the spring 14 on the slider 12. As soon as the free end of the tape measure 1 is drawn taut about the object, the tension of the spring 14 will be overcome thus moving the rod 9 outwardly and in turn removing the closure 12 to uncover the opening 10. The reading of the measurement is that obtained by sighting the lines $10^a$ with the graduations on the tape measure 1. The action above described is particularly true in measuring the waist of a person, where the resiliency of the spring 14 will act to secure a proper measurement for the making of a comfortable fitting of a garment.

By reference to Fig. 1 it will readily be observed that in taking a measurement, the distance between the sight lines $10^a$ and the end of the tape line 1 which is secured to the bail 11, is taken into consideration. For this purpose the numerals on the tape line begin with "3" so that when the tape line is drawn taut about an object, the spring 14 will be fully contracted and the member 11 fully drawn out. At this time the distance between the first numeral on the tape line, and the sight lines 10ª, is three inches, and thus it will be understood that the numeral appearing in the first opening 10 will represent the direct reading of the dimensions of the object.

From the above description taken in connection with the accompanying drawing, it is thought that a clear and comprehensive understanding of the construction, operation and advantages of my invention may be readily gathered and while I have shown and described the same as embodying a specific structure, I reserve the right to make changes therein which do not depart from the spirit and scope of the invention as claimed.

I claim—

1. In an indicator for tape measures, the combination of a housing, a flexible measuring element adapted to pass therethrough, a guide plate carried by the housing, said guide plate being provided with a sight opening, a closure plate slidably connected to the casing for closing said sight opening at times, and means connected with the flexible measuring element and with said closure plate for opening and closing the sight opening.

2. In an indicator for tape measures, the combination of a housing constructed of a sheet of bendable metal formed to provide a protecting and guiding plate, said plate having a sight aperture therein, a closure for said aperture, the plate and housing being adapted to receive a tape measure therebetween, one end of the tape being connected with said closure.

3. In an indicator for tape measures, the combination of housing having one wall thereof extended to provide a protecting plate arranged in spaced relation thereto, said plate having a guide flange thereon and a sight aperture therein, a closure plate, a spring pressed rod associated therewith, said rod having one extremity thereof connected with one extremity of a tape measure, the opposite extremity of said tape measure being receivable under the protecting plate whereby to be partially exposed through the sight aperature at times.

4. An indicating device for tape measures constructed from a single strip of bendable metal formed to provide a housing, one wall of said housing being laterally extended and bent into parallel relation to the adjacent wall of said housing to provide a guide plate, said guide plate having a sight aperture therein, a closure for said aperture slidable under said guide plate, resilient means associated with the closure for normally maintaining the same in closed position, said closure having connection with one extremity of a tape measure, the opposite extremity of the tape measure being receivable under the guide plate whereby to be partially exposed through said aperture at times.

5. An indicating device for tape measures constructed of a single strip of bendable metal formed to provide a housing, one wall of said housing being laterally extended and bent into parallel relation with the adjacent wall of the housing to provide a guide plate, said guide plate having a sight opening therein, a slidable closure for said opening arranged under said guide plate, a looped rod connected with said closure, a spring engaged with the rod for normally maintaining the slidable closure in closed position, the looped end of said rod being engaged with one extremity of a tape measure the opposite extremity of said tape measure being adapted to be received between the guide plate and housing whereby a portion thereof will be exposed through said aperture, at times.

In testimony whereof I affix my signature in presence of two witnesses.

CLARENCE A. SNIDER.

Witnesses:
 MAE BECK,
 CATHERINE LOES.

Copies of this patent may be obtained for five cents each, by addressing the "Commissioner of Patents. Washington, D. C."